US007703038B1

(12) United States Patent
Anastasopoulos

(10) Patent No.: US 7,703,038 B1
(45) Date of Patent: Apr. 20, 2010

(54) METHODS AND APPARATUS FOR CREATING A QUICK CANVAS

(75) Inventor: Paul Anastasopoulos, Santa Cruz, CA (US)

(73) Assignee: Adobe Systems Inc., San Jose, CA (US)

( * ) Notice: Subject to any disclaimer, the term of this patent is extended or adjusted under 35 U.S.C. 154(b) by 514 days.

(21) Appl. No.: 11/528,006

(22) Filed: Sep. 26, 2006

(51) Int. Cl.
*G06F 3/048* (2006.01)

(52) U.S. Cl. ...................... 715/781; 715/764

(58) Field of Classification Search ........... 715/764, 715/781
See application file for complete search history.

(56) References Cited

U.S. PATENT DOCUMENTS

| | | | | |
|---|---|---|---|---|
| 5,140,677 A | * | 8/1992 | Fleming et al. | 715/835 |
| 5,845,299 A | * | 12/1998 | Arora et al. | 715/209 |
| 6,587,596 B1 | * | 7/2003 | Haeberli | 382/283 |
| 6,941,276 B2 | * | 9/2005 | Haeberli | 705/26 |
| 7,243,079 B1 | * | 7/2007 | Manolis et al. | 705/27 |
| 7,256,911 B2 | * | 8/2007 | Takabayashi et al. | 358/1.9 |
| 2003/0103234 A1 | * | 6/2003 | Takabayashi et al. | 358/1.15 |
| 2003/0160824 A1 | * | 8/2003 | Szumla | 345/769 |
| 2005/0210414 A1 | * | 9/2005 | Angiulo et al. | 715/838 |
| 2007/0030506 A1 | * | 2/2007 | Takabayashi et al. | 358/1.9 |

* cited by examiner

*Primary Examiner*—William L Bashore
*Assistant Examiner*—David Phantana-angkool
(74) *Attorney, Agent, or Firm*—Chapin IP Law, LLC

(57) ABSTRACT

A system renders a graphical user interface to allow editing of graphics within a work area. The system receives a start input to define a start of the work area at a start location of a pointing device on the graphical user interface. The system receives a motion input that alters a location of the pointing device on the graphical user interface from the start location to an end location. The system receives an end input to define an end of the work area at the end location of the pointing device defined upon receipt of the end input, and creates the work area in which graphics may be edited between the start location and the end location of the pointing device on the graphical user interface. The work area defines a graphics editing region confined between the start input and the end input.

32 Claims, 13 Drawing Sheets

205 MODIFY THE WORK AREA DEFINED BY THE START LOCATION AND THE END LOCATION OF THE POINTING DEVICE ON THE GRAPHICAL USER INTERFACE

206 RECEIVE A MODIFICATION INPUT FROM THE INPUT DEVICE, THE MODIFICATION INPUT MODIFYING A LOCATION WITHIN THE GRAPHICAL USER INTERFACE WHERE THE WORK AREA IS POSITIONED

207 ROTATE THE WORK AREA WITHIN THE GRAPHICAL USER INTERFACE

208 RECEIVE A MODIFICATION INPUT FROM THE INPUT DEVICE, THE MODIFICATION INPUT MODIFYING A SIZE ASSOCIATED WITH THE WORK AREA

209 IDENTIFY AT LEAST ONE EDGE DEFINING THE WORK AREA WITHIN THE GRAPHICAL USER INTERFACE

210 RECEIVE A MODIFICATION INPUT, FROM THE INPUT DEVICE, ON THE AT LEAST ONE EDGE, THE MODIFICATION INPUT MODIFYING THE SIZE ASSOCIATED WITH THE WORK AREA BY MODIFYING A LOCATION ON THE GRAPHICAL USER INTERFACE AT WHICH THE AT LEAST ONE EDGE IS LOCATED

*FIG. 7*

215 MODIFY THE WORK AREA DEFINED BY THE START LOCATION AND THE END LOCATION OF THE POINTING DEVICE ON THE GRAPHICAL USER INTERFACE

216 IDENTIFY AT LEAST ONE GRAPHIC WITHIN THE WORK AREA

217 IDENTIFY A SIZE ASSOCIATED WITH THE AT LEAST ONE GRAPHIC

218 IDENTIFY A LOCATION ASSOCIATED WITH THE AT LEAST ONE GRAPHIC WITH RESPECT TO THE WORK AREA

219 IN RESPONSE TO MODIFYING THE WORK AREA, PROPORTIONALLY MODIFY THE SIZE OF THE AT LEAST ONE GRAPHIC WITHIN THE WORK AREA

220 IN RESPONSE TO MODIFYING THE WORK AREA, RELOCATE THE LOCATION OF THE AT LEAST ONE GRAPHIC WITH RESPECT TO THE WORK AREA

FIG. 9

221 MODIFY THE WORK AREA DEFINED BY THE START LOCATION AND THE END LOCATION OF THE POINTING DEVICE ON THE GRAPHICAL USER INTERFACE

222 IDENTIFY AT LEAST ONE GRAPHIC WITHIN THE WORK AREA

223 IDENTIFY A SIZE ASSOCIATED WITH THE AT LEAST ONE GRAPHIC

224 IDENTIFY A LOCATION ASSOCIATED WITHIN THE AT LEAST ONE GRAPHIC WITH RESPECT TO THE GRAPHICAL USER INTERFACE

225 IN RESPONSE TO MODIFYING THE WORK AREA, MAINTAIN THE SIZE ASSOCIATED WITH THE AT LEAST ONE GRAPHIC WITHIN THE WORK AREA

226 IN RESPONSE TO MODIFYING THE WORK AREA, MAINTAIN THE LOCATION OF THE AT LEAST ONE GRAPHIC WITH RESPECT TO THE GRAPHICAL USER INTERFACE

*FIG. 10*

227 MODIFY THE WORK AREA DEFINED BY THE START LOCATION AND THE END LOCATION OF THE POINTING DEVICE ON THE GRAPHICAL USER INTERFACE

228 IDENTIFY A PLURALITY OF WORK AREAS WITHIN THE GRAPHICAL USER INTERFACE

229 IDENTIFY A SELECTION OF THE PLURALITY OF WORK AREAS

230 RECEIVE A MODIFICATION INPUT FROM THE INPUT DEVICE

231 MODIFY THE PLURALITY OF WORK AREAS BASED ON THE MODIFICATION INPUT

FIG. 11

238 CREATE THE WORK AREA IN WHICH GRAPHICS MAY BE EDITED BETWEEN THE START LOCATION AND THE END LOCATION OF THE POINTING DEVICE ON THE GRAPHICAL USER INTERFACE, THE WORK AREA DEFINING A GRAPHICS EDITING REGION CONFINED BETWEEN THE START INPUT AND THE END INPUT

239 IDENTIFY A SET OF START LOCATION COORDINATES ASSOCIATED WITH THE START LOCATION ON THE GRAPHICAL USER INTERFACE

240 IDENTIFY A SET OF END LOCATION COORDINATES ASSOCIATED WITH THE END LOCATION ON THE GRAPHICAL USER INTERFACE

241 MAP AN AREA CREATED BY THE SET OF START LOCATION COORDINATES AND THE SET OF END LOCATION COORDINATES TO A SET OF WORK AREA DIMENSIONS FOR WHICH TO CREATE THE WORK AREA

242 POSITION THE WORK AREA WITHIN THE GRAPHICAL USER INTERFACE WITHIN THE AREA CREATED BY THE SET OF START LOCATION COORDINATES AND THE SET OF END LOCATION COORDINATES

*FIG. 13*

METHODS AND APPARATUS FOR CREATING A QUICK CANVAS

BACKGROUND

Conventional computerized devices, such as personal computers, laptop computers, and the like utilize graphical user interfaces in applications such as operating systems and graphical editors (i.e., web page editors, document editors, image editors, etc.) that enable users to quickly provide input and create documents and/or projects using "What You See Is What You Get" (WYSIWYG) technology. In general, using a graphical user interface, a user operates an input device such as a mouse or keyboard to manipulate graphical objects on a computer display. The graphical objects are often represented as icons, lines, shapes, etc., and the user can operate an input device such as a mouse to move a mouse pointer onto an icon (i.e., graphically overlapping the icon) on the graphical user interface. By depressing a mouse button, the application, such as the operating system desktop, selects the icon, and if the user maintains the mouse button in a depressed state, the user can drag the icon across the graphical user interface. By releasing the mouse button, the icon is placed on the graphical user interface at the current position of the mouse pointer.

Most conventional graphical editors provide a work area on which graphical editing is performed. The work area, more commonly known as a 'canvas', is a window within the graphical user interface in which the graphical editing is performed (for example, an image is created or edited, etc.). Essentially, the work area, or canvas, is the on screen counterpart of the cloth canvas an artist used to create a painting.

SUMMARY

Conventional technologies for graphical editing suffer from a variety of deficiencies. In particular, conventional technologies in graphical editors that provide creation and editing of a canvas are limited in that the creation and/or editing of the canvas are a multi-step process. Typically, a user accesses a contextual menu, or selects a keyboard shortcut to generate a dialog box that allows the user to enter input to set the parameters (or change the parameters), such as the height and width of the canvas. Once the input is entered, the user indicates the input has been entered (for example, the user clicks an 'OK' button within the dialog box), the canvas is created and/or modified.

Embodiments disclosed herein significantly overcome such deficiencies and provide a system that includes a computer system executing a rapid canvas creating process that allows a user to quickly create or modify a canvas within a graphical user interface by placing a mouse on a starting point within a graphical user interface, dragging the mouse to an ending point within the graphical user interface, and upon indicating the end point of the canvas within the graphical user interface (i.e., selecting or releasing the mouse), the rapid canvas creating process creates the canvas within the area located between the starting point and the ending point. These quick steps save the user the multiple steps of invoking the dialog box, and entering the parameters associated with the canvas. In an example embodiment, the user selects at least one keyboard shortcut while performing the steps of placing, dragging and releasing the mouse to create the canvas. Once the canvas is created, the user can modify the canvas in a number of ways. The user can select an edge of the canvas (i.e., a horizontal or vertical edge if the canvas is a square or rectangle), and modify the size of the canvas. The user can also select an edge corner of the canvas and modify both the horizontal and vertical edges of the canvas simultaneously. During modification of the dimensions of the canvas, the user can choose whether any graphical objects within the canvas are resized proportionally with the modification of the canvas, or if those graphical objects remain the same size within the canvas. The user can also select whether those graphical objects within the canvas are relocated with respect to the position of the canvas or whether those graphical objects remain located with respect to the graphical user interface. For example, a canvas contains a graphical object, such as a circle, centered at the coordinates 5,5 within the canvas. As the canvas is resized, the circle is resized proportionally with respect to the size of the canvas, and therefore, the circle moves with respect to the canvas and is no longer centered at the coordinates of 5,5. In another example, the canvas contains a graphical object, such as a circle, centered at the coordinates 5,5 within the graphical user interface. As the canvas is resized, the circle is not resized proportionally (i.e., the circle retains the circle's original size) with respect to the size of the canvas. Therefore, the circle remains centered at the coordinates 5,5 with respect to the graphical user interface. In this example, it is possible that the re-sizing of the canvas can occlude the circle (i.e., if the canvas is reduced in size to the point where the circle is no longer visible within the canvas). However, if that same canvas is re-sized and made larger, the circle (centered at coordinates 5,5 with respect to the graphical user interface) will re-appear once the area of the canvas has been enlarged to reveal the area associated with the coordinates 5,5 with respect to the graphical user interface. The user can select the canvas and move the canvas within the graphical user interface, as well as rotate the canvas within the graphical user interface. As noted above, when moving the location of the canvas, the user has the option of specifying whether any graphical objects within the canvas are moved with respect to the canvas, or remain located in their original positions with respect to the graphical user interface. The user also has the option to modify the canvas by invoking the traditional dialog box to that is customarily used to modify the canvas. It should be noted that the work area can be any shape and is not limited to a square, rectangle, etc.

The rapid canvas creating process renders a graphical user interface to allow editing of graphics within a work area (i.e., a canvas). The rapid canvas creating process receives a start input to define a start of the work area at a start location of a pointing device on the graphical user interface. The rapid canvas creating process receives a motion input that alters a location of the pointing device on the graphical user interface from the start location to an end location. The rapid canvas creating process then receives an end input to define an end of the work area at the end location of the pointing device defined upon receipt of the end input. Finally, the rapid canvas creating process creates the work area in which graphics may be edited between the start location and the end location of the pointing device on the graphical user interface. The work area defines a graphics editing region confined (i.e., saving the contents of the work area saves those contents that are contained within the work area) between the start input and the end input.

During an example operation of one embodiment, suppose a user, operating a graphical editor within a graphical user interface, places a mouse in a general upper left hand corner of the graphical user interface. The user selects a keyboard shortcut (for example, 'cntrl-N'), and begins to drag the mouse diagonally toward a general lower right hand corner of the graphical user interface. Upon releasing the mouse, the canvas is created from the area identified by the coordinates associated with the position of the mouse general upper left hand corner of the graphical user interface, and the position of the mouse in the general lower right hand corner of the graphical user interface when the mouse is released.

Once the canvas is created, the user is able to select an area of the canvas (with the mouse) and re-position the canvas in another area within the graphical user interface. The user can also select a horizontal or vertical edge of the canvas with the mouse, and enlarge or reduce the size of the canvas by re-locating the horizontal or vertical edge within the graphical user interface.

The user can also modify the dimension of the canvas by invoking a dialog box and entering parameters into the dialog box (i.e., parameters that will modify the dimensions of the canvas), and clicking 'OK' within the dialog box.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 7 illustrates a flowchart of a procedure performed by the system of FIG. 1, when the rapid canvas creating process modifies the work area defined by the start location and the end location of the pointing device on the graphical user interface, according to one embodiment disclosed herein.

FIG. 9 illustrates a flowchart of a procedure performed by the system of FIG. 1, when the rapid canvas creating process modifies the work area defined by the start location and the end location of the pointing device on the graphical user interface, the work area containing at least one graphical object, according to one embodiment disclosed herein.

FIG. 10 illustrates a flowchart of a procedure performed by the system of FIG. 1, when the rapid canvas creating process modifies the work area defined by the start location and the end location of the pointing device on the graphical user interface, the work area containing at least one graphical object positioned with respect to the graphical user interface, according to one embodiment disclosed herein.

FIG. 11 illustrates a flowchart of a procedure performed by the system of FIG. 1, when the rapid canvas creating process modifies the work area defined by the start location and the end location of the pointing device on the graphical user interface, and identifies a plurality of work areas within the graphical user interface, according to one embodiment disclosed herein.

FIG. 13 illustrates a flowchart of a procedure performed by the system of FIG. 1, when the rapid canvas creating process creates the work area in which graphics may be edited between the start location and the end location of the pointing device on the graphical user interface, the work area defining a graphics editing region confined between the start input and the end input, according to one embodiment disclosed herein.

DETAILED DESCRIPTION

Figure 1:
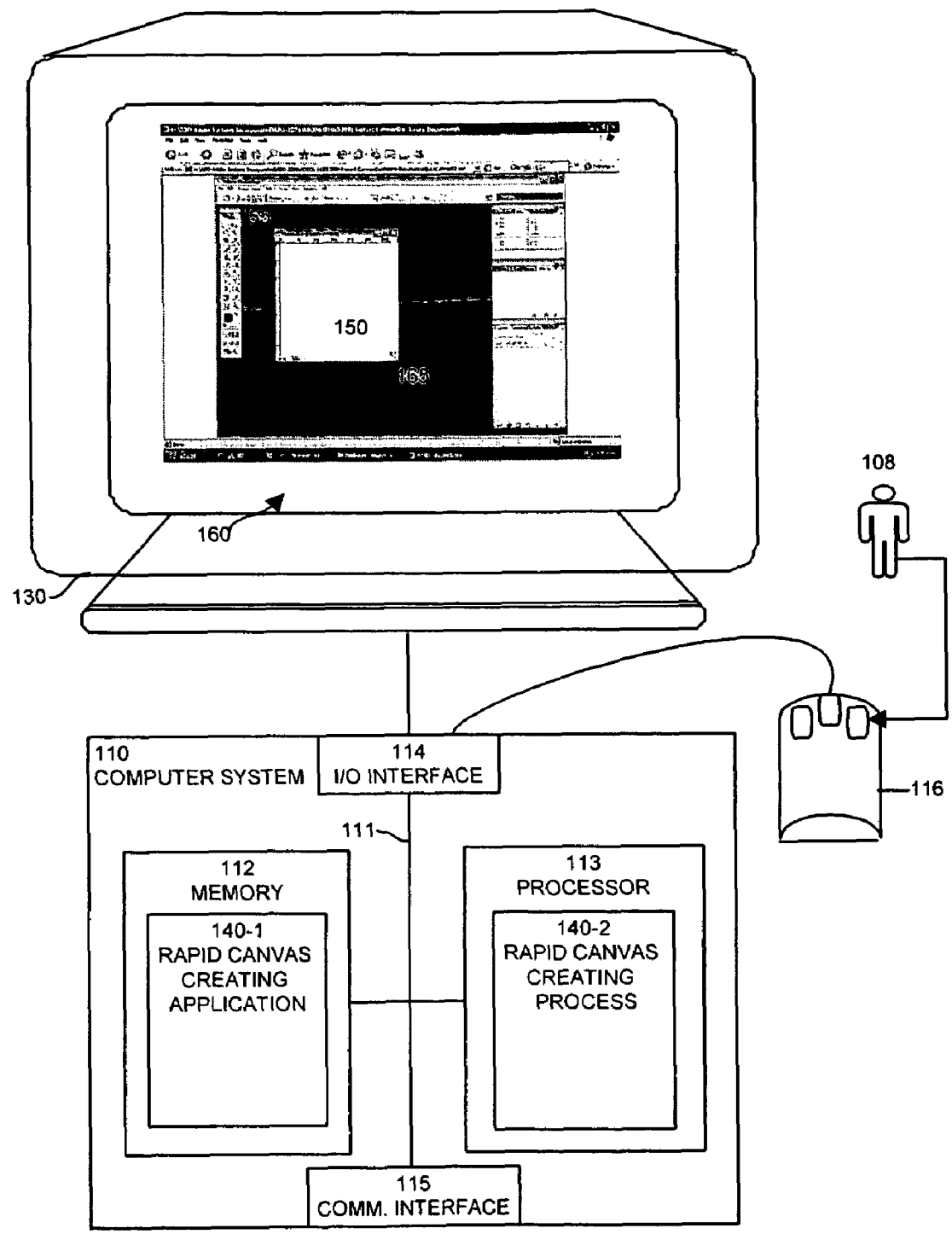
FIG. 1 shows a high level view of a document editor according to one embodiment disclosed herein.

Embodiments disclosed herein include a rapid canvas creating process that allows a user to quickly create or modify a canvas within a graphical user interface by placing a mouse on a on a starting point within a graphical user interface, dragging the mouse to an ending point within the graphical user interface, and upon indicating the end point of the canvas within the graphical user interface (i.e., selecting or releasing the mouse), the rapid canvas creating process creates the canvas within the area located between the starting point and the ending point. These quick steps save the user the multiple steps of invoking the dialog box, and entering the parameters associated with the canvas. In an example embodiment, the user selects at least one keyboard shortcut while performing the steps of placing, dragging and releasing the mouse to create the canvas. Once the canvas is created, the user can modify the canvas in a number of ways. The user can select an edge of the canvas (i.e., a horizontal or vertical edge if the canvas is a square or rectangle), and modify the size of the canvas. The user can also select an edge corner of the canvas and modify both the horizontal and vertical edges of the canvas simultaneously. During modification of the dimensions of the canvas, the user can choose whether any graphical objects within the canvas are resized proportionally with the modification of the canvas, or if those graphical objects remain the same size within the canvas. The user can also select whether those graphical objects within the canvas are relocated with respect to the position of the canvas or whether those graphical objects remain located with respect to the graphical user interface. For example, a canvas contains a graphical object, such as a circle, centered at the coordinates 5,5 within the canvas. As the canvas is resized, the circle is resized proportionally with respect to the size of the canvas, and therefore, the circle moves with respect to the canvas and is no longer centered at the coordinates of 5,5. In another example, the canvas contains a graphical object, such as a circle, centered at the coordinates 5,5 within the graphical user interface. As the canvas is resized, the circle is not resized proportionally (i.e., the circle retains the circle's original size) with respect to the size of the canvas. Therefore, the circle remains centered at the coordinates 5,5 with respect to the graphical user interface. In this example, it is possible that the re-sizing of the canvas can occlude the circle (i.e., if the canvas is reduced in size to the point where the circle is no longer visible within the canvas). However, if that same canvas is re-sized and made larger, the circle (centered at coordinates 5,5 with respect to the graphical user interface) will re-appear once the area of the canvas has been enlarged to reveal the area associated with the coordinates 5,5 with respect to the graphical user interface. The user can select the canvas and move the canvas within the graphical user interface, as well as rotate the canvas within the graphical user interface. As noted above, when moving the location of the canvas, the user has the option of specifying whether any graphical objects within the canvas are moved with respect to the canvas, or remain located in their original positions with respect to the graphical user interface. The user also has the option to modify the canvas by invoking the traditional dialog box to that is customarily used to modify the canvas. It should be noted that the work area can be any shape and is not limited to a square, rectangle, etc.

The rapid canvas creating process renders a graphical user interface to allow editing of graphics within a work area (i.e., a canvas). The rapid canvas creating process receives a start input to define a start of the work area at a start location of a pointing device on the graphical user interface. The rapid canvas creating process receives a motion input that alters a location of the pointing device on the graphical user interface from the start location to an end location. The rapid canvas creating process then receives an end input to define an end of the work area at the end location of the pointing device defined upon receipt of the end input. Finally, the rapid canvas creating process creates the work area in which graphics may be edited between the start location and the end location of the pointing device on the graphical user interface. The work area defines a graphics editing region confined (i.e., saving the contents of the work area saves those contents that are contained within the work area) between the start input and the end input.

FIG. 1 is a block diagram illustrating example architecture of a computer system 110 that executes, runs, interprets, operates or otherwise performs a rapid canvas generating application 140-1 and process 140-2. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a pointing device, keyboard, mouse, etc.) couples to processor 113 through I/O interface 114, and enables a user 108 to provide input commands and generally control the graphical user interface 160 that the rapid canvas generating application 140-1 and process 140-2 provides on the display 130. The graphical user interface 160 displays a work area 150 created by indicating a start location 155 of the work area 150 and an end location 165 of the work area 150. The communications interface 115 enables the computer system 110 to communicate with other devices (i.e., other computers) on a network (not shown). This can allow access to the rapid canvas generating application by remote computer systems and in some embodiments, the work area 150 from a remote source via the communications interface 115.

The memory system 112 is any type of computer readable medium and in this example is encoded with a rapid canvas generating application 140-1. The rapid canvas generating application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the rapid canvas generating application 140-1. Execution of rapid canvas generating application 140-1 in this manner produces processing functionality in a rapid canvas creating process 140-2. In other words, the rapid canvas creating process 140-2 represents one or more portions of runtime instances of the rapid canvas generating application 140-1 (or the entire application 140-1) performing or executing within or upon the processor 113 in the computerized device 110 at runtime.

Figure 2:
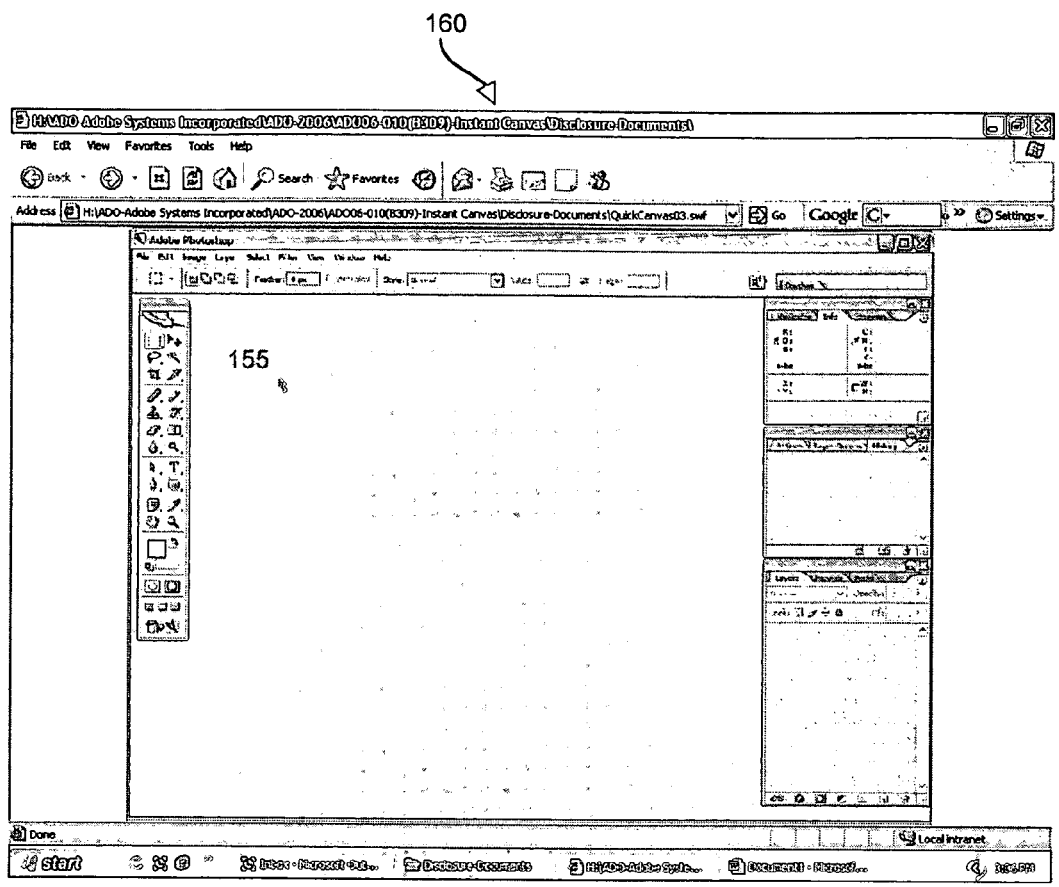
FIG. 2 illustrates an example screenshot of a graphical user interface with an input device at a start location, according to one embodiment disclosed herein.

FIG. 2 is an example screenshot of a graphical user interface 160 containing a start location 155. In this example, a user 108 has placed an input device 116, such as a mouse, pointing to an area on the graphical user interface 160, to indicate the starting location 155 of the work area 150 that is to be created.

Figure 3:
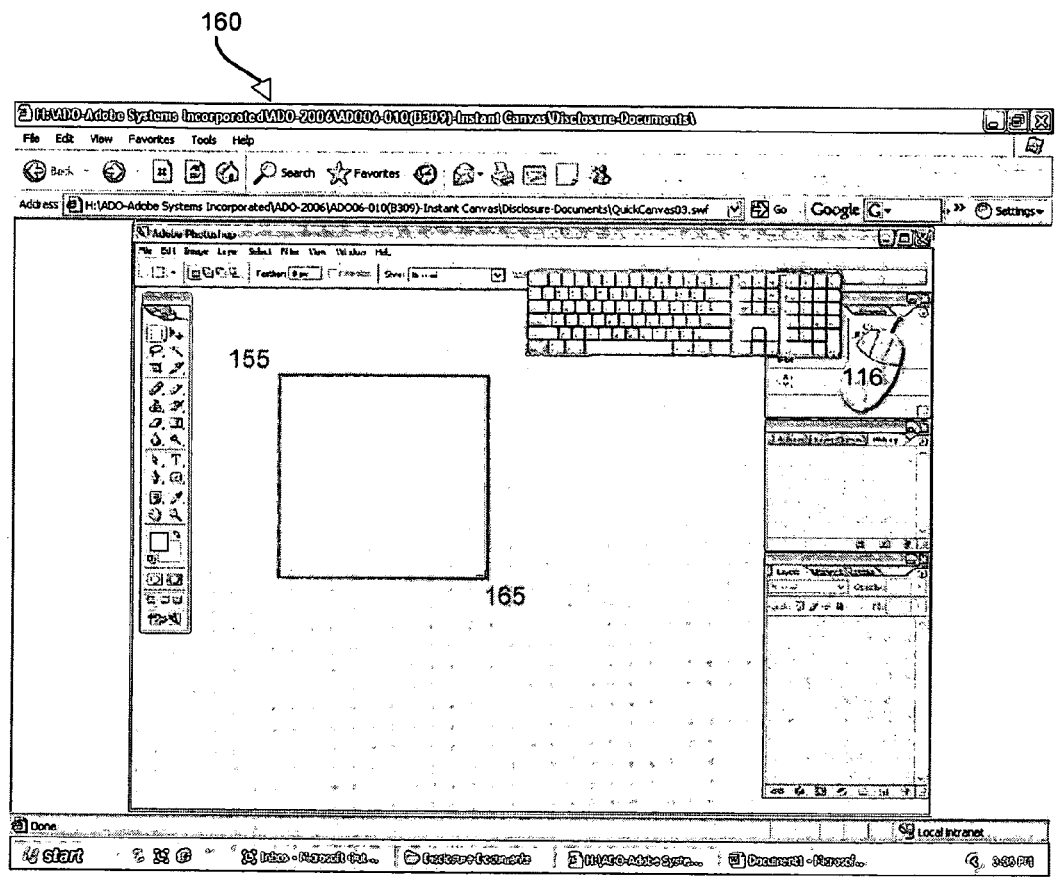
FIG. 3 illustrates an example screenshot of a graphical user interface with an input device at an end location, according to one embodiment disclosed herein.

FIG. 3 is an example screenshot of a graphical user interface 160 containing a start location 155 and an end location 165 of the work area 150 (not yet created). In this example, a user 108 has placed an input device 116, such as a mouse, on the graphical user interface 160, to indicate the starting location 155 of the work area 150, and dragged the input device 116 to the end location 165. In an example embodiment, the user 108 may depress the input device 116 at the starting location, keep the input device 116 depressed while dragging the input device to the end location 165, and then release the input device 116 upon arriving at the end location 165. In another example embodiment, the user 108 may select (i.e., 'click and release') the input device 116 at the starting location, drag the input device to the end location 165, and then select (i.e., 'click and release') the input device 116 upon arriving at the end location 165.

Figure 4:
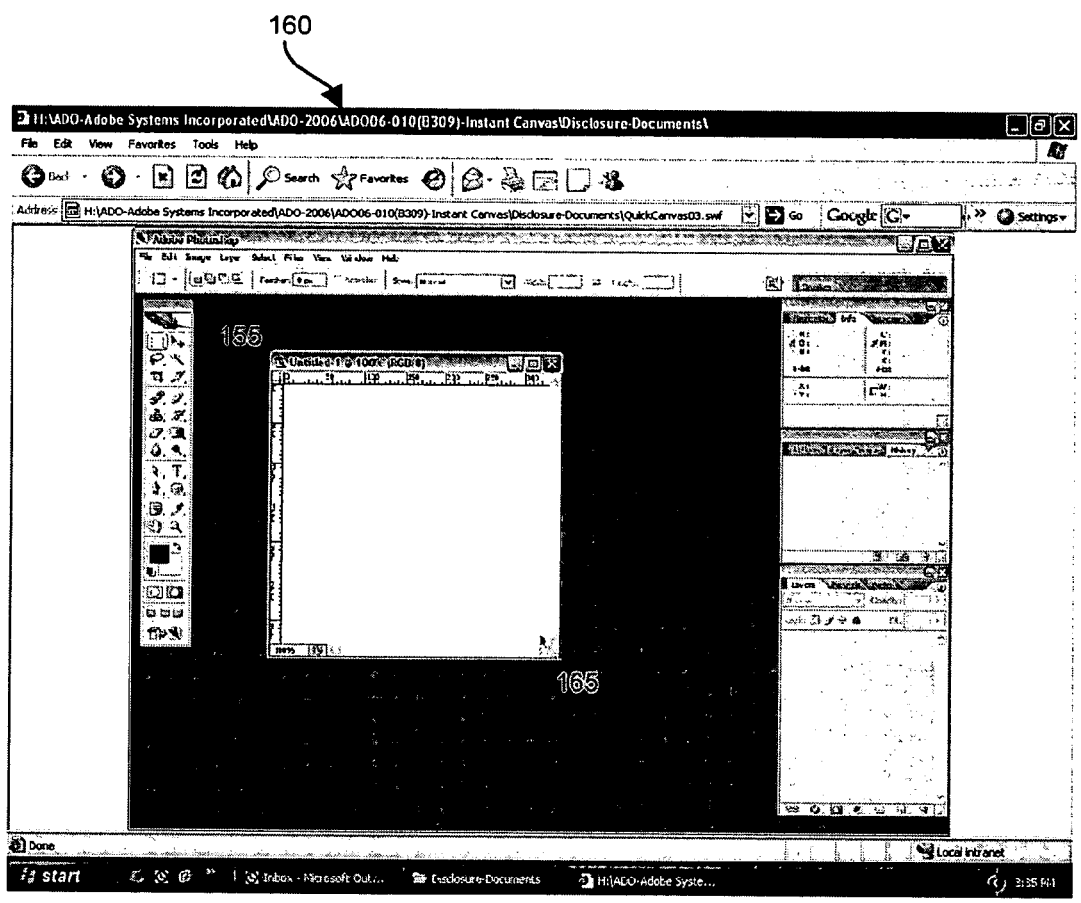
FIG. 4 illustrates an example screenshot of a graphical user interface with a work area created via the rapid canvas creating process, according to one embodiment disclosed herein.

FIG. 4 is an example screenshot of a graphical user interface 160 containing a work area 150 that has been created by specifying a start location 155 and an end location 165 using an input device 116, such as a mouse, keyboard, etc. Once created, the work area 150 can be modified by selecting one or more edges of the work area 150 with an input device 116, and re-sizing the work area 150 by repositioning the edge(s) of the work area 150. The location of the work area 150 within the graphical user interface 160 can also be modified by selecting the work area 150 and repositioning the work area 150 as a whole, within the graphical user interface 160.

Figure 5:
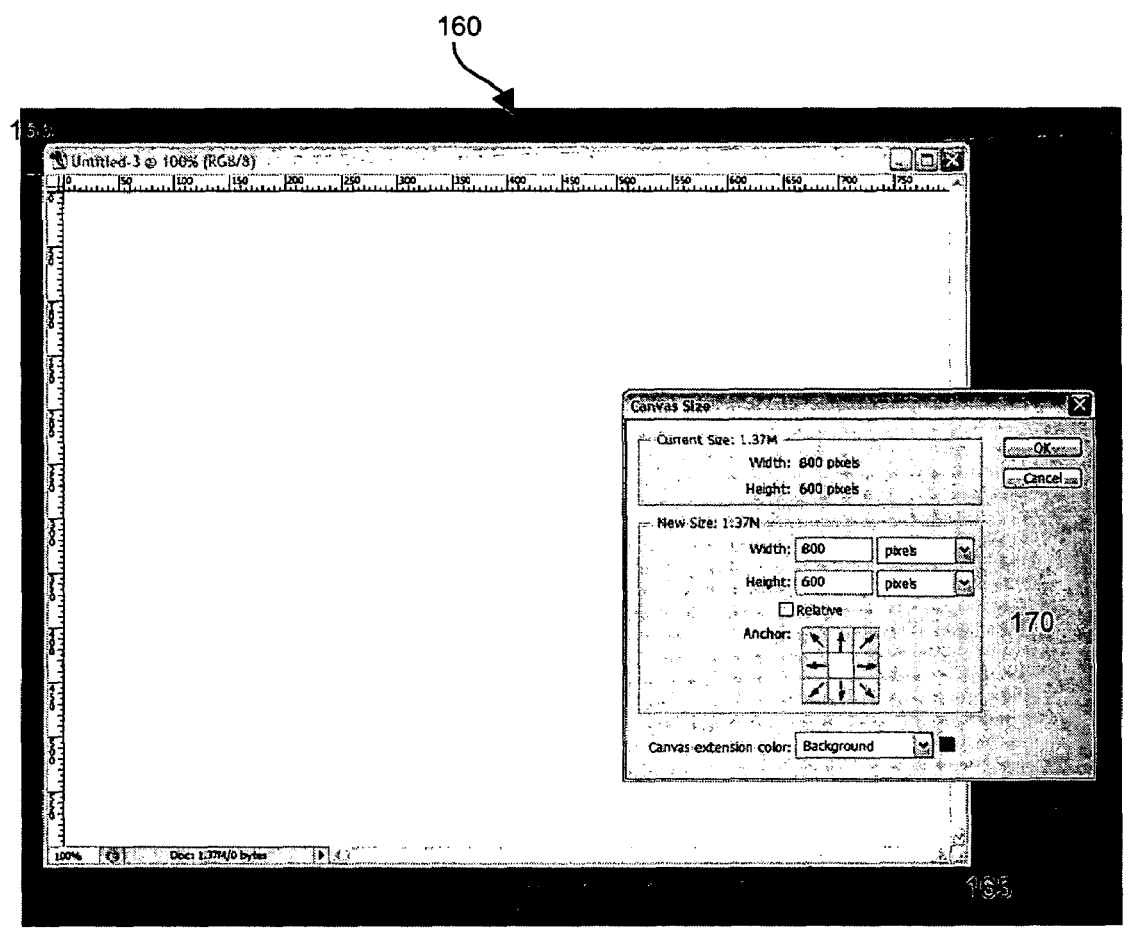
FIG. 5 illustrates an example screenshot of a graphical user interface with a dialog box used to modify a work area created via the rapid canvas creating process, according to one embodiment disclosed herein.

FIG. 5 is an example screenshot of a work area 150 that has been created by specifying a start location 155 and an end location 165 using an input device 116, such as a mouse, and a dialog box 170. Once created, the work area 150 can be modified by invoking a dialog box 170, and modifying the parameters of the work area 150 via input entered into the dialog box 170.

Further details of configurations explained herein will now be provided with respect to a flow chart of processing steps that show the high level operations disclosed herein to perform the content formatting process.

Figure 6:
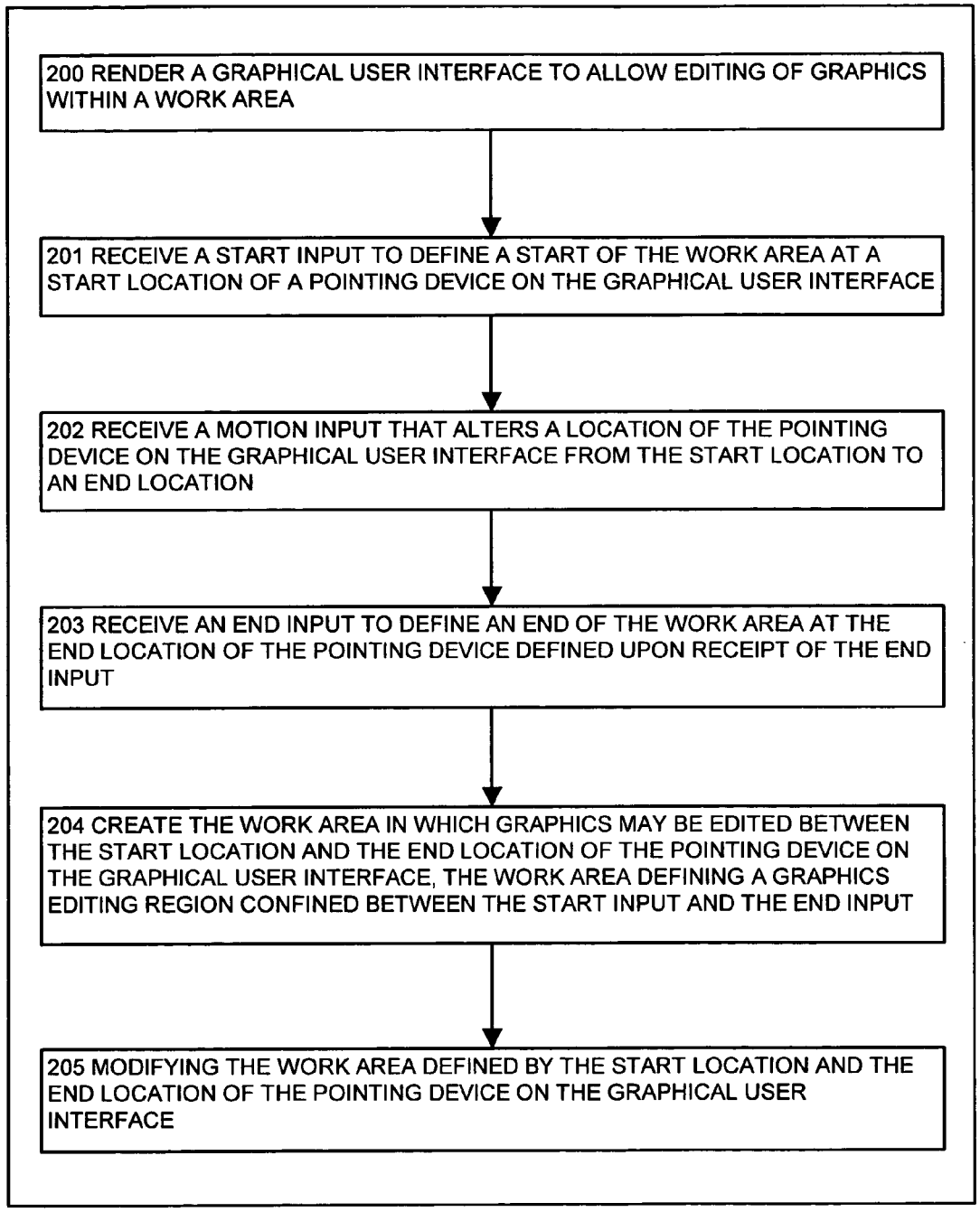
FIG. 6 illustrates a flowchart of a procedure performed by the system of FIG. 1, when the rapid canvas creating process renders a graphical user interface to allow editing of graphics within a work area, according to one embodiment disclosed herein.

FIG. 6 is an embodiment of the steps performed by the rapid canvas creating process 140-2 when it renders a graphical user interface 160 to allow editing of graphics within a work area 150.

In step 200, the rapid canvas creating process 140-2 renders a graphical user interface 160 to allow editing of graphics within a work area 150. The graphical user interface 160 may be an image editor, photo editor, etc.

In step 201, the rapid canvas creating process 140-2 receives a start input to define a start of the work area 150 at a start location of a pointing device 116 on the graphical user interface 160. The rapid canvas creating process 140-2 allows a user 108 to indicate the starting point of a work area 150 by placing a pointing device 116 within the graphical user interface 160.

In step 202, the rapid canvas creating process 140-2 receives a motion input that alters a location of the pointing device on the graphical user interface 160 from the start location 155 to an end location 165. In other words, the user 108 moves the input device 116 from the location 155 to an end location 165.

In step 203, the rapid canvas creating process 140-2 receives an end input to define an end of the work area 150 at the end location 165 of the pointing device 116 defined upon receipt of the end input. When the user 108 indicates the pointing device 116 is at the position of the end location 165 of the work area 150, the rapid canvas creating process 140-2 receives an end input that, coupled with the start input, defines the boundaries of the work area 150.

In step 204, the rapid canvas creating process 140-2 creates the work area 150 in which graphics may be edited between the start location 155 and the end location 165 of the pointing device 116 on the graphical user interface 160. The work area 150 defines a graphics editing region confined between the start input and the end input. The work area 150 (i.e., canvas) defines a region in which a use can create, edit, and modify graphical objects.

In step 205, the rapid canvas creating process 140-2 modifies the work area 150 defined by the start location 155 and the end location 165 of the pointing device 116 on the graphical user interface 160. Once the work area 150 has been created, the user 108 can modify the work area 150.

FIG. 7 is a continuation of FIG. 6 of the embodiment of the steps performed by the rapid canvas creating process 140-2 when it modifies the work area 150 defined by the start location 155 and the end location 165 of the pointing device 116 on the graphical user interface 160.

In step 206, the rapid canvas creating process 140-2 receives a modification input from the input device 116. The modification input modifies a location within the graphical user interface 160 where the work area 150 is positioned. For example, a user 108 can create a work area 150, via the rapid canvas creating process 140-2, in the upper left hand corner of the graphical user interface 160. Once created, the user 108 can select the work area 150 and re-position the work area 150 from the upper left hand corner of the graphical user interface 160 to the lower right hand corner of the graphical user interface 160. In one embodiment, any graphical objects contained within the work area 150 are re-positioned along with the work area 150. In another example embodiment, the graphical objects within the work area 150 are not re-positioned along with the re-positioned work area 150.

In step 207, the rapid canvas creating process 140-2 rotates the work area 150 within the graphical user interface 160. Once the work area 150 has been created, via the rapid canvas creating process 140-2, the user 108 can select the work area 150, and rotate the work area 150 within the graphical user interface 160.

In step 208, the rapid canvas creating process 140-2 receives a modification input from the input device 116. The modification input modifies a size associated with the work area 150. In other words, the user 108 can use the input device 116 to modify the overall size of the work area 150.

In step 209, the rapid canvas creating process 140-2 identifies at least one edge defining the work area 150 within the graphical user interface 160. For example, if the work area 150 is a rectangle or square, the work area 150 has two horizontal edges and two vertical edges. If the work area 150 is a circle, the work area 150 has one edge, surrounding the circumference of the work area 150.

In step 210, the rapid canvas creating process 140-2 receives a modification input, from the input device 116, on at least one edge. The modification input modifies the size associated with the work area 150 by modifying a location on the graphical user interface 160 at which the at least one edge is located. The user 108 can select, for example, a vertical edge of the work area 150 (using the input device 116) and widen the width of the work area 150. Likewise, the user 108 can select, a horizontal edge of the work area 150 (using the input device 116) and lengthen the height of the work area 150. The user 108 can also select two edges of the work area 150 simultaneously (i.e., place the input device 116 at the corner of, for example, a rectangular or square work area 150) to modify the both the horizontal and vertical dimensions of the work area 150.

Figure 8:
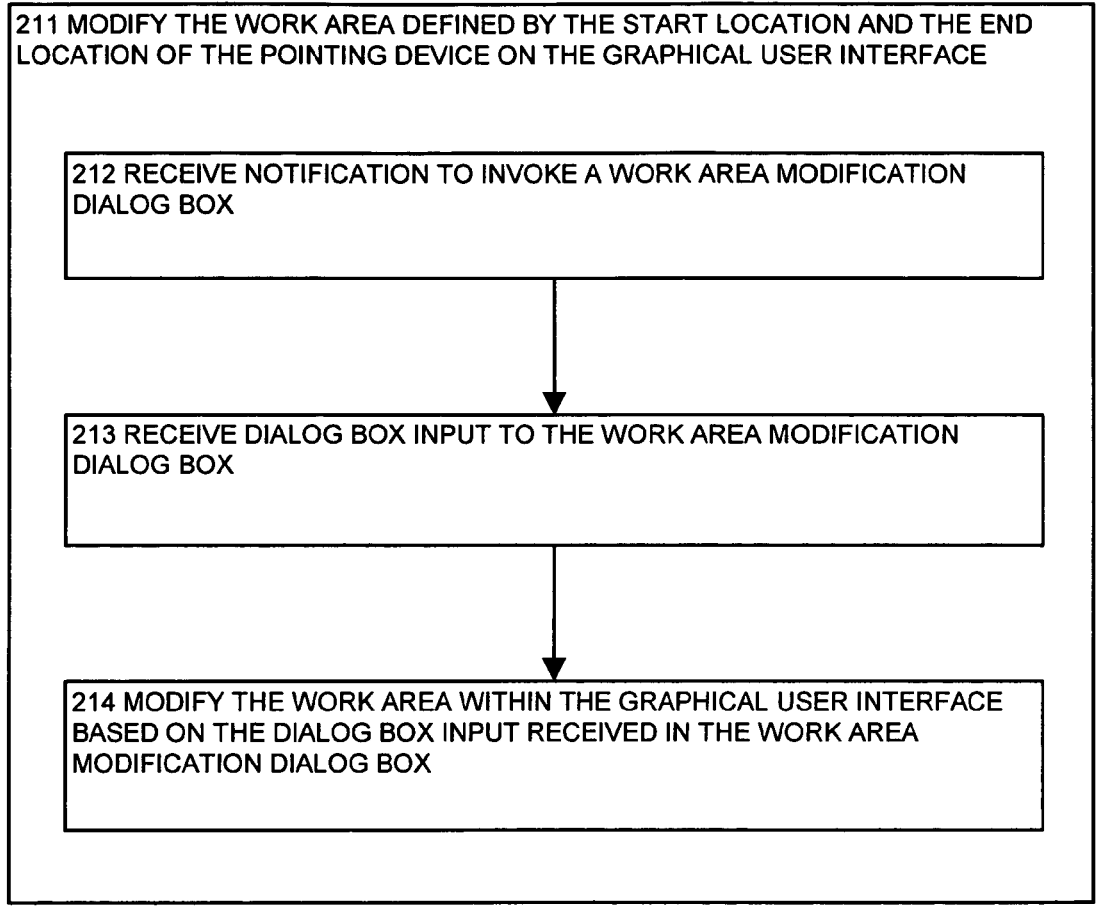
FIG. 8 illustrates a flowchart of a procedure performed by the system of FIG. 1, when the rapid canvas creating process modifies the work area defined by the start location and the end location of the pointing device on the graphical user interface, and receives input to invoke a dialog box, according to one embodiment disclosed herein.

FIG. 8 is an embodiment of the steps performed by the rapid canvas creating process 140-2 when it modifies the work area 150 defined by the start location 155 and the end location 165 of the pointing device 116 on the graphical user interface 160.

In step 211, the rapid canvas creating process 140-2 modifies the work area 150 defined by the start location 155 and the end location 165 of the pointing device 116 on the graphical user interface 160. The work area 150 can be modified via manipulating the size of the work area within the graphical user interface 160, or via a dialog box 170.

In step 212, the rapid canvas creating process 140-2 receives notification to invoke a work area modification dialog box 170. The user 108 performs a command within the graphical user interface 160 (such as keystroke shortcuts, using a contextual menu, etc.) to invoke a work area modification dialog box 170 with which to modify the work area 150 in the graphical user interface 160.

In step 213, the rapid canvas creating process 140-2 receives dialog box input to the work area modification dialog box 170. The user 108 enters parameter input into the data fields within the work area modification dialog box 170 to indicate the desired modifications to the work area 150. Once completed, the user 108 completes entering data into the work area modification dialog box 170, and, for example, click "OK" to eliminate the work area modification dialog box 170 from the graphical user interface 160.

In step 214, the rapid canvas creating process 140-2 modifies the work area 150 within the graphical user interface 160 based on the dialog box input received in the work area modification dialog box 170. The work area 150 is modified based on the parameters entered into the work area modification dialog box 170 by the user 108.

FIG. 9 is an embodiment of the steps performed by the rapid canvas creating process 140-2 when it modifies the work area 150 defined by the start location 155 and the end location 165 of the pointing device 116 on the graphical user interface 160.

In step 215, the rapid canvas creating process 140-2 modifies the work area 150 defined by the start location 155 and the end location 165 of the pointing device 116 on the graphical user interface 160.

In step 216, the rapid canvas creating process 140-2 identifies at least one graphic within the work area 150. Once created, the work area 150 can include graphic objects, such as images, shapes, text, etc.

In step 217, the rapid canvas creating process 140-2 identifies a size associated with the at least one graphic. The rapid canvas creating process 140-2 identifies the size of any graphic that is contained within the work area 150.

In step 218, the rapid canvas creating process 140-2 identifies a location associated with at least one graphic with respect to the work area 150. The rapid canvas creating process 140-2 identifies the position of the graphic within the work area 150. For example, the rapid canvas creating process 140-2 identifies the position of the graphic via the coordinates of the graphic with respect to the work area 150.

In response to modifying the work area 150, in step 219, the rapid canvas creating process 140-2, proportionally modifies the size of at least one graphic within the work area 150. In other words, as the size of the work area 150 is modified, the graphics within the work area 150 are also re-sized proportionally with respect to the re-sizing of the work area 150.

In response to modifying the work area 150, in step 220, the rapid canvas creating process 140-2 relocates the location of at least one graphic with respect to the work area 150. In other words, as the size of the work area 150 is modified, the graphics within the work area 150 are also re-sized proportionally, and re-positioned within the work area 150 with respect to the re-sizing of the work area 150.

FIG. 10 is an embodiment of the steps performed by the rapid canvas creating process 140-2 when it modifies the work area 150 defined by the start location 155 and the end location 165 of the pointing device 116 on the graphical user interface 160.

In step 221, the rapid canvas creating process 140-2 modifies the work area 150 defined by the start location 155 and the end location 165 of the pointing device 116 on the graphical user interface 160.

In step 222, the rapid canvas creating process 140-2 identifies at least one graphic within the work area 150. Once created, the work area 150 can include graphic objects, such as images, shapes, text, etc.

In step 223, the rapid canvas creating process 140-2 identifies a size associated with the at least one graphic. The rapid canvas creating process 140-2 identifies the size of any graphic that is contained within the work area 150.

In step 224, the rapid canvas creating process 140-2 identifies a location associated with at least one graphic with respect to the graphical user interface 160. The rapid canvas creating process 140-2 identifies the position of the graphic within the graphical user interface 160. For example, the rapid canvas creating process 140-2 identifies the position of the graphic via the coordinates of the graphic with respect to the graphical user interface 160.

In response to modifying the work area 150, in step 225, the rapid canvas creating process 140-2 maintains the size associated with at least one graphic within the work area 150. In other words, as the work area 150 is resized, the size of the graphic remains the same size and is not re-sized proportionally along with the work area 150.

In response to modifying the work area 150, in step 226, the rapid canvas creating process 140-2 maintains the location of at least one graphic with respect to the graphical user interface 160. In other words, as the work area 150 is re-sized, both the size of the graphic, and the location of the graphic (with respect to the graphical user interface 160) remain the same. For example, if the work area 150 contains a graphic, and the work area 150 is reduced in size, the graphic within the work area may be hidden from view to the user 108 by virtue of the fact that the location of the graphic with respect to the graphical user interface 160 is no longer within the boundaries of the work are 150. The graphic still exists as being on the work area 150 such that if the work area 150 is enlarged, the graphic will be viewable to the user 108.

FIG. 11 is an embodiment of the steps performed by the rapid canvas creating process 140-2 when it modifies the work area 150 defined by the start location 155 and the end location 165 of the pointing device 116 on the graphical user interface 160.

In step 227, the rapid canvas creating process 140-2 modifies the work area 150 defined by the start location 155 and the end location 165 of the pointing device 116 on the graphical user interface 160.

In step 228, the rapid canvas creating process 140-2 identifies a plurality of work areas 150 within the graphical user interface 150. The graphical user interface 160 can contain more than one work areas 150. A user 108 can interact with each work area 150 independent from every other work area 150.

In step 229, the rapid canvas creating process 140-2 identifies a selection of the plurality of work areas 150. A user 108 may select multiple work areas 150 at once, for example, by using a keyboard shortcut and selecting multiple work areas 150 with the input device 116, such as a mouse.

In step 230, the rapid canvas creating process 140-2 receives a modification input from the input device 116. For example, a user 108 may select an edge of one of the plurality of work areas 150.

In step 231, the rapid canvas creating process 140-2 modifies the plurality of work areas 150 based on the modification input. The modification that the user 108 performs on one or more work areas 150 is applied to all of the work areas 150 within the plurality of work areas 150 that are selected. In other words, the user 108 can select more than one work area 150 and perform modifications on all the selected work areas 150.

Figure 12:
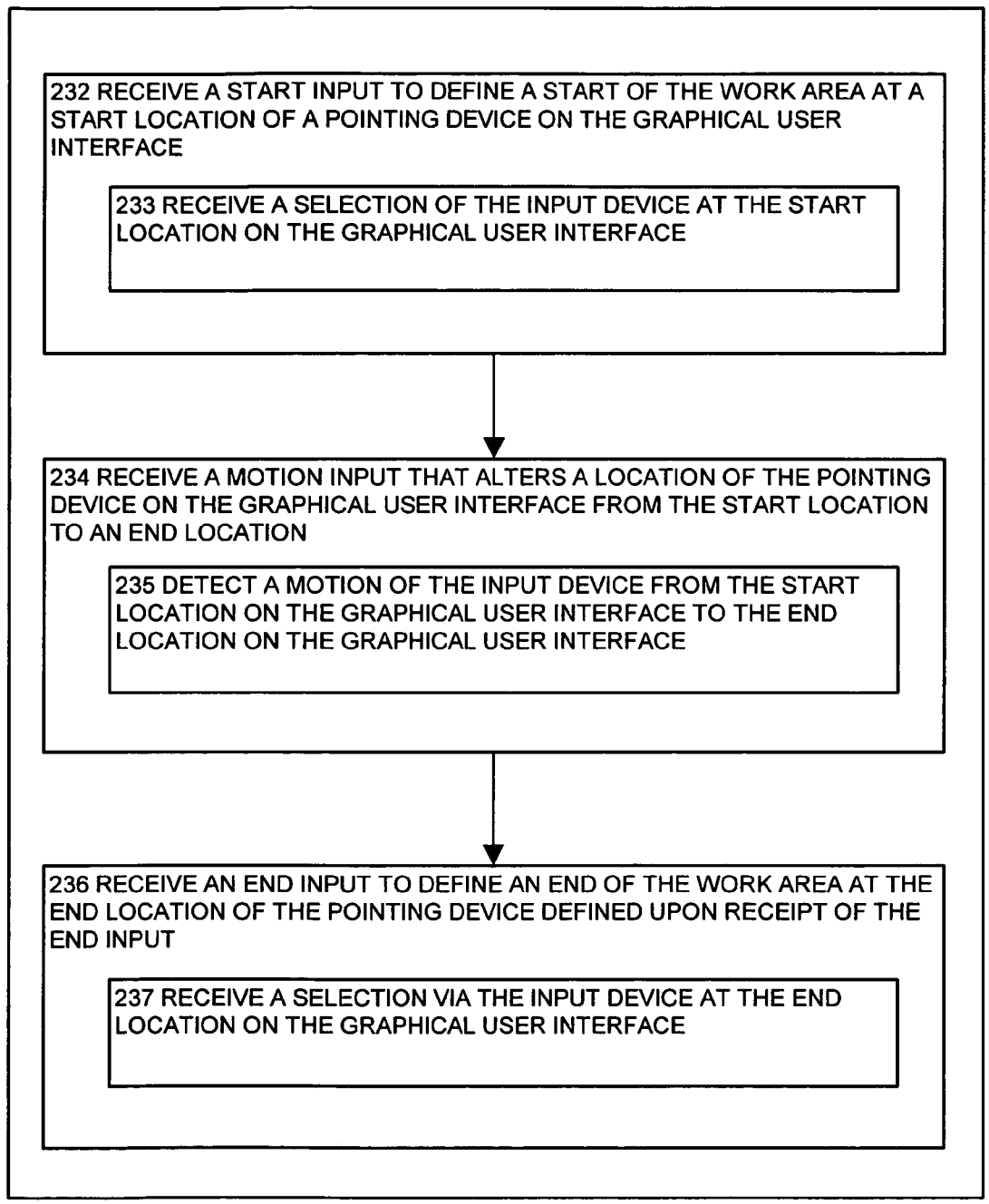
FIG. 12 illustrates a flowchart of a procedure performed by the system of FIG. 1, when the rapid canvas creating process receives a start input to define a start of the work area at a start location of a pointing device on the graphical user interface, according to one embodiment disclosed herein.

FIG. 12 is an embodiment of the steps performed by the rapid canvas creating process 140-2 when it receives a start input to define a start of the work area 150 at a start location 155 of a pointing device 116 on the graphical user interface 160.

In step 232, the rapid canvas creating process 140-2 receives a start input to define a start of the work area 150 at a start location of a pointing device 116 on the graphical user interface 160. The rapid canvas creating process 140-2 allows a user 108 to indicate the starting point of a work area 150 by placing a pointing device 116 within the graphical user interface 160.

In step 233, the rapid canvas creating process 140-2 receives a selection of the input device 116 at the start location 155 on the graphical user interface 160. For example, the user 108 places an input device 116, such as a mouse, on the graphical user interface 160, and depresses the input device 116.

In step 234, the rapid canvas creating process 140-2 receives a motion input that alters a location of the pointing device on the graphical user interface 160 from the start location 155 to an end location 165. In other words, the user 108 moves the input device 116 from the location 155 to an end location 165.

In step 235, the rapid canvas creating process 140-2 detects a motion of the input device 116 from the start location 155 on the graphical user interface 160 to the end location 165 on the graphical user interface 160. In other words, the user 108 moves the input device 116, such as a mouse, from the start location 155 to the end location 165 in one sweeping motion.

In step 236, the rapid canvas creating process 140-2 receives an end input to define an end of the work area 150 at the end location 165 of the pointing device 116 defined upon receipt of the end input. When the user 108 indicates the pointing device 116 is at the position of the end location 165 of the work area 150, the rapid canvas creating process 140-2 receives an end input that, coupled with the start input, defines the boundaries of the work area 150.

In step 237, the rapid canvas creating process 140-2 receive a selection via the input device at the end location 165 on the graphical user interface 160. In other words, when the user 108 has reached the end location 165 of the (to be created) work area 150, the user 108 releases the depressed input device 116.

FIG. 13 is an embodiment of the steps performed by the rapid canvas creating process 140-2 when it creates the work area 150 in which graphics may be edited between the start location 155 and the end location 165 of the pointing device 116 on the graphical user interface 160.

In step 238, the rapid canvas creating process 140-2 creates the work area 150 in which graphics may be edited between the start location 155 and the end location 165 of the pointing device 116 on the graphical user interface 160. The work area 150 defines a graphics editing region confined between the start input and the end input.

In step 239, the rapid canvas creating process 140-2 identifies a set of start location coordinates associated with the start location 155 on the graphical user interface 160. When the user 108 indicates the start location 155 of the (to be created) work area 150 (via the input device 116), the rapid canvas creating process 140-2 identifies a set of coordinates that correspond to the start location 155 on the graphical user interface 160, such as (0,0) on the graphical user interface 160.

In step 240, the rapid canvas creating process 140-2 identifies a set of end location coordinates associated with the end location 165 on the graphical user interface 160. When the user 108 indicates the end location 165 of the (to be created) work area 150, the rapid canvas creating process 140-2 identifies a set of coordinates that correspond to the end location 165 on the graphical user interface 160, such as (4,4) on the graphical user interface 160.

In step 241, the rapid canvas creating process 140-2 maps an area created by the set of start location coordinates and the set of end location coordinates to a set of work area dimensions for which to create the work area 150. For example, if the start location coordinates are (0,2), and the end location coordinates are (5,8), then the rapid canvas creating process 140-2 calculates the horizontal boundary of the work area 150 to be five units (5 minus 0), and the vertical boundary of the work area 150 to be six units (8 minus 2). Thus the area of the (to be created) work area 150 is five by six units.

In step 242, the rapid canvas creating process 140-2 positions the work area 150 within the graphical user interface 160 within the area created by the set of start location coordinates and the set of end location coordinates. For example, the work area 150 would be positioned within the start location coordinates (0,2), and the end location coordinates (5,8).

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:

1. A computer-implemented method in which at least one computer system accesses instructions from computer storage and executes the instructions to perform steps comprising:

rendering a graphical user interface on a display screen associated with the at least one computer to allow editing of graphics within a work area;

receiving a start input to define a start of the work area at a start location of a pointing device on the graphical user interface;

receiving a motion input that alters a location of the pointing device on the graphical user interface from the start location to an end location;

receiving an end input to define an end of the work area at the end location of the pointing device defined upon receipt of the end input;

creating the work area in which graphics may be edited between the start location and the end location of the pointing device on the graphical user interface, the work area defining a graphics editing region confined between the start input and the end input;

rendering the graphical user interface as a main computer application window on the display screen;

populating the main computer application window with a first set of multiple selectable icons for selective resizing of the main computer application window on the display screen, the first set of multiple selectable icons displayed at a perimeter location of the main computer application window;

prior to creation of the work area, rendering a portion of the main computer application window to include display of first default background content; and wherein creating the work area includes:
  displaying the work area as an additional computer application window over a portion of the first default background content of the main application window;
  populating the additional computer application window with a second set of multiple selectable icons, the second set of multiple selectable icons enabling selective resizing of the additional computer application window on the display screen, the multiple selectable icons displayed at a location perimeter of the additional computer application window; and
  populating the additional computer application window with second default background content that is visually different than the first default background content.

2. The computer-implemented method of claim 1 comprising:
  modifying the work area defined by the start location and the end location of the pointing device on the graphical user interface.

3. The computer-implemented method of claim 2 wherein modifying the work area defined by the start location and the end location of the pointing device on the graphical user interface comprises:
  receiving a modification input from the input device, the modification input modifying a location within the graphical user interface where the work area is positioned.

4. The computer-implemented method of claim 3 wherein receiving a modification input from the input device, the modification input modifying a location within the graphical user interface where the work area is positioned comprises:
  rotating the work area within the graphical user interface.

5. The computer-implemented method of claim 2 wherein modifying the work area defined by the start location and the end location of the pointing device on the graphical user interface comprises:
  receiving a modification input from the input device, the modification input modifying a size associated with the work area.

6. The computer-implemented method of claim 5 wherein receiving a modification input from the input device, the modification input modifying a size associated with the work area comprises:
  identifying at least one edge defining the work area within the graphical user interface; and
  receiving a modification input, from the input device, on the at least one edge, the modification input modifying the size associated with the work area by modifying a location on the graphical user interface at which the at least one edge is located.

7. The computer-implemented method of claim 2 wherein modifying the work area defined by the start location and the end location of the pointing device on the graphical user interface comprises:
  receiving notification to invoke a work area modification dialog box; receiving dialog box input to the work area modification dialog box; and
  modifying the work area within the graphical user interface based on the dialog box input received in the work area modification dialog box.

8. The computer-implemented method of claim 2 wherein modifying the work area defined by the start location and the end location of the pointing device on the graphical user interface comprises:
  identifying at least one graphic within the work area;
  identifying a size associated with the at least one graphic;
  identifying a location associated with the at least one graphic with respect to the work area;
  in response to modifying the work area, proportionally modifying the size of the at least one graphic within the work area; and
  in response to modifying the work area, relocating the location of the at least one graphic with respect to the work area.

9. The computer-implemented method of claim 2 wherein modifying the work area defined by the start location and the end location of the pointing device on the graphical user interface comprises:
  identifying at least one graphic within the work area;
  identifying a size associated with the at least one graphic;
  identifying a location associated within the at least one graphic with respect to the graphical user interface;
  in response to modifying the work area, maintaining the size associated with the at least one graphic within the work area; and
  in response to modifying the work area, maintaining the location of the at least one graphic with respect to the graphical user interface.

10. The computer-implemented method of claim 2 wherein modifying the work area defined by the start location and the end location of the pointing device on the graphical user interface comprises:
  identifying a plurality of work areas within the graphical user interface;
  identifying a selection of the plurality of work areas;
  receiving a modification input from the input device; and
  modifying the plurality of work areas based on the modification input.

11. The computer-implemented method of claim 1 wherein receiving a start input to define a start of the work area at a start location of a pointing device on the graphical user interface comprises:
  receiving a selection of the input device at the start location on the graphical user interface; and
  wherein receiving a motion input that alters a location of the pointing device on the graphical user interface from the start location to an end location comprises:
  detecting a motion of the input device from the start location on the graphical user interface to the end location on the graphical user interface; and
  wherein receiving an end input to define an end of the work area at the end location of the pointing device defined upon receipt of the end input comprises:
  receiving a selection via the input device at the end location on the graphical user interface.

12. The computer-implemented method of claim 1 wherein creating the work area in which graphics may be edited between the start location and the end location of the pointing device on the graphical user interface comprises:
  identifying a set of start location coordinates associated with the start location on the graphical user interface;
  identifying a set of end location coordinates associated with the end location on the graphical user interface;
  mapping an area created by the set of start location coordinates and the set of end location coordinates to a set of work area dimensions for which to create the work area; and
  positioning the work area within the graphical user interface within the area created by the set of start location coordinates and the set of end location coordinates.

13. The computer-implemented method as in claim 1 further comprising:
rendering the graphical user interface as a computer application window on the display screen;
populating the computer application window with multiple selectable icons for selective resizing of the computer application window on the display screen, the multiple selectable icons displayed at a perimeter location of the computer application window;
prior to creation of the work area, rendering a portion of the computer application window to include display of default background content; and
wherein creating the work area includes displaying the work area over the default background content.

14. The computer-implemented method as in claim 13, comprising:
wherein receiving the start input includes receiving the start input at a first location of the default background content displayed in the computer application window;
wherein receiving the end input includes receiving the end input at a second location of the default background content displayed in the computer application window; and
wherein displaying the work area over the portion of the default background content includes displaying the work area within boundaries as defined by the first location and the second location of the default background content.

15. The computer-implemented method as in claim 13 further comprising:
initiating display of a toolbar over a first portion of the default background content; and
wherein creating the work area includes initiating display of the work area over a second portion of the default background content.

16. The computer-implemented method as in claim 1, wherein creating the work area further comprises:
populating a perimeter region of the additional computer application window with a border; and
initiating display of text-based characters in the border, the text-based characters specifying a title associated with a document being edited in the additional computer application window.

17. The computer-implemented method as in claim 1, wherein creating the work area further comprises:
populating a perimeter region of the additional computer window with scale information for measuring of graphical objects being edited in the additional computer application window.

18. The computer-implemented method as in claim 1, wherein the first default background content is a display region for receiving the start input, the motion input, and the end input for creation of the additional computer application window; and
wherein the second default background content is part of a canvas subsequently populated with graphical objects.

19. The computer-implemented method as in claim 1, wherein receiving the start input further comprises detecting depressing of a computer mouse at the start location, the start location being a first location on the first default background content; wherein receiving the end input further comprises detecting release of the computer mouse at the end location, the end location being a second location on the first default background content; and wherein displaying the work area as the additional computer application window occurs upon release of the computer mouse at the second location.

20. The computer-implemented method as in claim 1, comprising:
wherein rendering the graphical user interface includes rendering an application display region generated by a graphics editing application;
displaying a graphics editing toolbar at a first position within the application display region; and
wherein creating the work area includes displaying the graphics editing region within the application display region next to the toolbar.

21. The computer-implemented method as in claim 1, comprising:
receiving image content for display in the work area, the image content received subsequent to creation and display of the work area.

22. The computer-implemented method as in claim 1, comprising:
wherein rendering the graphical user interface includes rendering the graphical user interface to include an application display region generated by a graphics editing application;
wherein the application display region comprises a plurality of positional coordinates, each positional coordinate identifying a respective location within the application display region;
wherein receiving the start input includes receiving an initial user selection of positional coordinates from the plurality of positional coordinates of the application display region;
wherein receiving the motion input includes receiving successive user selections of multiple positional coordinates from the plurality of positional coordinates of the application display region;
wherein receiving the end input includes receiving a last user selection of positional coordinates from the plurality of positional coordinates of the application display region; and
wherein creating the work area includes defining the graphics editing region on a portion of the application display region that encompasses each of the positional coordinates selected by the user.

23. The computer-implemented method as in claim 1 further comprising:
populating the main computer application window with the first set of multiple selectable icons for selective resizing of the main computer application window on the display screen, the first set of multiple selectable icons displayed at a perimeter location of the main computer application window;
prior to creation of the work area, rendering a portion of the computer application window to include display of first default background content, the first default background content being a display region in which to receive the start input, the motion input, and the end input;
utilizing the start location of the pointing device and the end location of the pointing device to define a transparent window;
displaying the transparent window over the first default background content, the first default background content viewable through an interior of the transparent window; and
wherein creating the work area includes:
discontinuing display of the temporary window;
in a boundary region defined by the temporary window, initiating display of the work area as an additional computer application window over the first default background content;

populating the additional computer application window with a second set of multiple selectable icons, the second set of multiple selectable icons enabling selective resizing of the additional computer application window on the display screen, the second set of multiple selectable icons displayed at a perimeter location of the additional computer application window;

populating a background field of the additional computer application window with second default background content that is visually different than the first default background content of the main computer application;

populating a perimeter region of the additional computer application window with a border; and initiating display of text-based characters in the border, the text-based characters being a title associated with a document being edited in the additional computer application window.

24. The computer-implemented method as in claim 23, wherein receiving the start input further comprises detecting depressing of a computer mouse at the start location, the start location being a first location on the first default background content;

wherein receiving the end input further comprises detecting release of the computer mouse at the end location, the end location being a second location on the first default background content; and wherein discontinuing display of the temporary window and initiating display of the work area in the boundary region defined by the temporary window occurs upon release of the computer mouse at the second location.

25. A computerized device comprising:

a memory;

a processor;

a communications interface;

an interconnection mechanism coupling the memory, the processor and the communications interface;

wherein the memory is encoded with a rapid canvas creating application that when executed on the processor is capable of rapidly creating a canvas on the computerized device by performing the operations of:

rendering a graphical user interface to allow editing of graphics within a work area;

receiving a start input to define a start of the work area at a start location of a pointing device on the graphical user interface;

receiving a motion input that alters a location of the pointing device on the graphical user interface from the start location to an end location;

receiving an end input to define an end of the work area at the end location of the pointing device defined upon receipt of the end input;

and creating the work area in which graphics may be edited between the start location and the end location of the pointing device on the graphical user interface, the work area defining a graphics editing region confined between the start input and the end input;

rendering the graphical user interface as a main computer application window on the display screen;

populating the main computer application window with a first set of multiple selectable icons for selective resizing of the main computer application window on the display screen, the first set of multiple selectable icons displayed at a perimeter location of the main computer application window;

prior to creation of the work area, rendering a portion of the main computer application window to include display of first default background content; and wherein creating the work area includes:

displaying the work area as an additional computer application window over a portion of the first default background content of the main application window;

populating the additional computer application window with a second set of multiple selectable icons, the second set of multiple selectable icons enabling selective resizing of the additional computer application window on the display screen, the multiple selectable icons displayed at a location perimeter of the additional computer application window; and populating the additional computer application window with second default background content that is visually different than the first default background content.

26. The computerized device of claim 25 wherein the computerized device is capable of performing the operation of:

modifying the work area defined by the start location and the end location of the pointing device on the graphical user interface.

27. The computerized device of claim 26 wherein when the computerized device performs the operation of modifying the work area defined by the start location and the end location of the pointing device on the graphical user interface, the computerized device is capable of performing the operation of:

receiving a modification input from the input device, the modification input modifying a size associated with the work area.

28. The computerized device of claim 27 wherein when the computerized device performs the operation of receiving a modification input from the input device, the modification input modifying a size associated with the work area, the computerized device is capable of performing the operation of:

identifying at least one edge defining the work area within the graphical user interface; and receiving a modification input, from the input device, on the at least one edge, the modification input modifying the size associated with the work area by modifying a location on the graphical user interface at which the at least one edge is located.

29. The computerized device of claim 26 wherein when the computerized device performs the operation of modifying the work area defined by the start location and the end location of the pointing device on the graphical user interface, the computerized device is capable of performing the operation of:

identifying at least one graphic within the work area;

identifying a size associated with the at least one graphic;

identifying a location associated with the at least one graphic with respect to the work area;

in response to modifying the work area, proportionally modifying the size of the at least one graphic within the work area; and in response to modifying the work area, relocating the location of the at least one graphic with respect to the work area.

30. The computerized device of claim 26 wherein when the computerized device performs the operation of modifying the work area defined by the start location and the end location of the pointing device on the graphical user interface, the computerized device is capable of performing the operation of:

identifying at least one graphic within the work area;

identifying a size associated with the at least one graphic;

identifying a location associated within the at least one graphic with respect to the graphical user interface;

in response to modifying the work area, maintaining the size associated with the at least one graphic within the work area; and in response to modifying the work area, maintaining the location of the at least one graphic with respect to the graphical user interface.

31. The computerized device of claim 26 wherein when the computerized device performs the operation of modifying the work area defined by the start location and the end location of the pointing device on the graphical user interface, the computerized device is capable of performing the operation of:

identifying a plurality of work areas within the graphical user interface;

identifying a selection of the plurality of work areas;

receiving a modification input from the input device; and modifying the plurality of work areas based on the modification input.

32. A computer readable medium encoded with computer programming logic that when executed on a process in a computerized device provides rapid canvas creation, the medium comprising:

instructions for rendering a graphical user interface to allow editing of graphics within a work area;

instructions for receiving a start input to define a start of the work area at a start location of a pointing device on the graphical user interface; instructions for receiving a motion input that alters a location of the pointing device on the graphical user interface from the start location to an end location;

instructions for receiving an end input to define an end of the work area at the end location of the pointing device defined upon receipt of the end input;

instructions for creating the work area in which graphics may be edited between the start location and the end location of the pointing device on the graphical user interface, the work area defining a graphics editing region confined between the start input and the end inputs rendering the graphical user interface as a main computer application window on the display screen;

populating the main computer application window with a first set of multiple selectable icons for selective resizing of the main computer application window on the display screen, the first set of multiple selectable icons displayed at a perimeter location of the main computer application window;

prior to creation of the work area, rendering a portion of the main computer application window to include display of first default background content; and wherein creating the work area includes:

displaying the work area as an additional computer application window over a portion of the first default background content of the main application window;

populating the additional computer application window with a second set of multiple selectable icons, the second set of multiple selectable icons enabling selective resizing of the additional computer application window on the display screen, the multiple selectable icons displayed at a location perimeter of the additional computer application window; and populating the additional computer application window with second default background content that is visually different than the first default background content.

* * * * *